United States Patent
Byun et al.

(10) Patent No.: US 10,235,693 B2
(45) Date of Patent: Mar. 19, 2019

(54) METHOD AND SYSTEM FOR PROVIDING ADVERTISEMENT BASED ON GAZE OF USER

(71) Applicant: NAVER Business Platform Corp., Seongnam-Si, Gyeonggi-Do (KR)

(72) Inventors: Eunja Byun, Seongnam-si (KR); Sukku Yu, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 1110 days.

(21) Appl. No.: 14/035,054

(22) Filed: Sep. 24, 2013

(65) Prior Publication Data
US 2014/0089097 A1    Mar. 27, 2014

(30) Foreign Application Priority Data

Sep. 24, 2012 (KR) ........................ 10-2012-0105871

(51) Int. Cl.
*G06Q 30/02* (2012.01)
(52) U.S. Cl.
CPC ................................ *G06Q 30/0267* (2013.01)
(58) Field of Classification Search
CPC .................................. G06Q 30/0207–30/0284
USPC ............................................. 705/14.1–14.73
See application file for complete search history.

(56) References Cited

U.S. PATENT DOCUMENTS

| 2008/0147488 A1* | 6/2008 | Tunick | G06Q 30/02 705/7.29 |
| 2010/0328492 A1 | 12/2010 | Fedorovskaya et al. | |
| 2012/0256967 A1* | 10/2012 | Baldwin | G06F 3/013 345/684 |

FOREIGN PATENT DOCUMENTS

| JP | 2003256713 A | 9/2003 |
| JP | 2004102475 A | 4/2004 |
| JP | 2004240492 A | 8/2004 |
| JP | 2008-040884 A | 2/2008 |
| JP | 2008-203971 A | 9/2008 |
| JP | 2009180840 A | 8/2009 |
| JP | 2010061218 A | 3/2010 |
| JP | 2011008751 A | 1/2011 |
| KR | 20080051664 A | 6/2008 |
| KR | 10-2011-0035162 | 4/2011 |

OTHER PUBLICATIONS

Drewes et al.,"Eye-Gaze Interaction for Mobile Phones", Proc of the 4th Intl. Conf. on Mobile Technology, Application and Systems, pp. 364-368) (Year: 2007).*

(Continued)

*Primary Examiner* — John Van Bramer
(74) *Attorney, Agent, or Firm* — Harness, Dickey, & Pierce, P.L.C.

(57) ABSTRACT

Methods and systems of modifying content displayed by a mobile device are provided. A region of interest (ROI) of a user is recognized. The ROI may be associated with content being displayed on a display of the mobile device. A time duration of interest based on the ROI is determined. The displayed content is modified based on the ROI, the time duration of interest, and a content type of the displayed content.

17 Claims, 9 Drawing Sheets

(56) References Cited

OTHER PUBLICATIONS

Korean Office Action dated Mar. 11, 2014 in corresponding application No. 10-2012-0105871.
Japanese Office Action dated Aug. 19, 2014 in corresponding Japanese Application No. 2013-164840.
Office Action for corresponding Japanese Application No. 2015-093029 dated Apr. 26, 2016.
Japanese Office Action dated Dec. 6, 2016 in corresponding Japanese Patent Application 2015-093029.

* cited by examiner

METHOD AND SYSTEM FOR PROVIDING ADVERTISEMENT BASED ON GAZE OF USER

CROSS-REFERENCE TO RELATED APPLICATION

This application claims priority from and the benefit of Korean Patent Application No. 10-2012-0105871, filed on Sep. 24, 2012, which is hereby incorporated by reference in its entirety for all purposes as if fully set forth herein.

BACKGROUND

Field

One aspect of the example embodiments relate to a method and system for providing an advertisement based on a gaze of a user.

Description of the Background

A gaze tracking method refers to a method of verifying a position at which a user gazes on a screen device, such as a computer monitor and the like. For example, Korean Patent Publication No. 10-2008-0051664 discloses a technology of tracking a position at which a user is gazing using an eye image of the user toward which infrared rays (IR) are illuminated.

Such gaze tracking technology may be used for a variety of fields. For instance, such gaze tracking technology may serve as an input device for a user having a disability and/or a discomfort in using a hand operated input device. Gaze tracking technology may also provide a high level of immersion to a user.

SUMMARY

According to an example embodiment, a method of modifying content displayed by a mobile device is provided. The method may include recognizing a region of interest (ROI) of a user. The ROI may be associated with content being displayed on a display of the mobile device. The method may include determining a time duration of interest based on the ROI. The method may include modifying the displayed content based on the ROI, the time duration of interest, and a content type of the displayed content.

In one example embodiment, the recognizing may include determining a gaze area of the user by analyzing information being input through a camera of the mobile device. The ROI may correspond to the determined gaze area.

In one example embodiment, the determining may include determining a gaze area of the user by analyzing information being input through a camera of the mobile device, and determining, as the time duration of interest, an amount of time that the user gazes at the gaze area.

In one example embodiment, the modifying may include modifying at least one of a format, a form, a size, and a position of the displayed content based on at least one of the content type and a position of the ROI. Modifying the displayed content may also include providing additional content associated with the content type when the time duration of interest is greater than or equal to a desired amount of time.

In one example embodiment, the method may further include altering the displayed content when the ROI is changed in response to the modifying.

In one example embodiment, the altering may include at least one of restoring the displayed content to an original state providing an action corresponding to the changed ROI, and terminating displaying of the displayed content.

In one example embodiment, the displayed content may include a user interface for interacting with a user of the mobile device, the user interface may provide content to the mobile device in response to a user event.

In one example embodiment, the displayed content may be an advertisement. The method may further include charging an advertising cost associated with displaying the advertisement to an advertiser, and charging an additional advertising cost based on modifying the advertisement to the advertiser.

According to another example embodiment, a system for modifying displayed content is provided. The system may include a server including a mobile application providing module configured to provide a mobile application to a mobile device. The mobile application may be used for controlling the mobile device to display content on a display of the mobile device. The mobile application may be used for controlling the mobile device to recognize a region of interest (ROI) of a user. The ROI may be associated with content being displayed on a display of the mobile device. The mobile application may be used for controlling the mobile device to determine a time duration of interest based on the ROI. The mobile may be used for controlling the mobile device to modify the displayed content based on the ROI, the time duration of interest, and a content type of the displayed content.

In one example embodiment, the mobile application may be for controlling the mobile device to determine a gaze area of the user by analyzing information that is input through a camera of the mobile device. The ROI may correspond to the gaze area.

In one example embodiment, the mobile application may be for controlling the mobile device to determine a gaze area of the user by analyzing information that is input through a camera of the mobile device, and determine, as the time duration of interest, an amount of time that the user gazes at the gaze area.

In one example embodiment, the mobile application may be for controlling the mobile device to modify at least one of a format, a form, a size, and a position of the displayed content based on at least one of the content type and a position of the ROI. The mobile application may be for controlling the mobile device to provide additional content associated with the content type when the time duration of interest is greater than or equal to a desired amount of time.

In one example embodiment, the mobile application may be for controlling the mobile device to alter the content when the ROI is changed in response to modifying the displayed content.

In one example embodiment, wherein in altering the displayed content, the mobile application may be for controlling to mobile device to restore the modified content to an original state, provide an action corresponding to the changed ROI, or terminate displaying of the displayed content.

In one example embodiment, the mobile application may be for controlling the mobile device to display, on the display of the mobile device, an advertisement including a user interface for interacting with a user of the mobile device such that the user interface provides content to the mobile device in response to a user event.

In one example embodiment, the displayed content is an advertisement. The system may be configured to charge an advertising cost associated with displaying the advertisement to an advertiser, and charge an additional advertising cost based on modifying the displayed content to the advertiser.

According to an example embodiment, a non-transitory computer-readable storage medium may include program segments for, when executed by a computer system, cause the computer system to implement the method of modifying content displayed by a mobile device.

According to an example embodiment, a method of modifying content displayed by a mobile device is provided. The method may include modifying content displayed on the mobile device based on a region of interest (ROI) detected by a gaze tracking device associated with the mobile device.

In one example embodiment, the displayed content may include a plurality of areas and the modifying may modify the displayed content according to the gaze detecting device detecting the ROI within at least one of the plurality of areas.

In one example embodiment, the modifying may modify the displayed content according to a position of the ROI.

In one example embodiment, the modifying may be based on the ROI and a time duration of interest. The time duration of interest may be based on an amount of time associated with the position of the ROI.

In one example embodiment, the modifying may modify the displayed content according to a changing position of the ROI.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
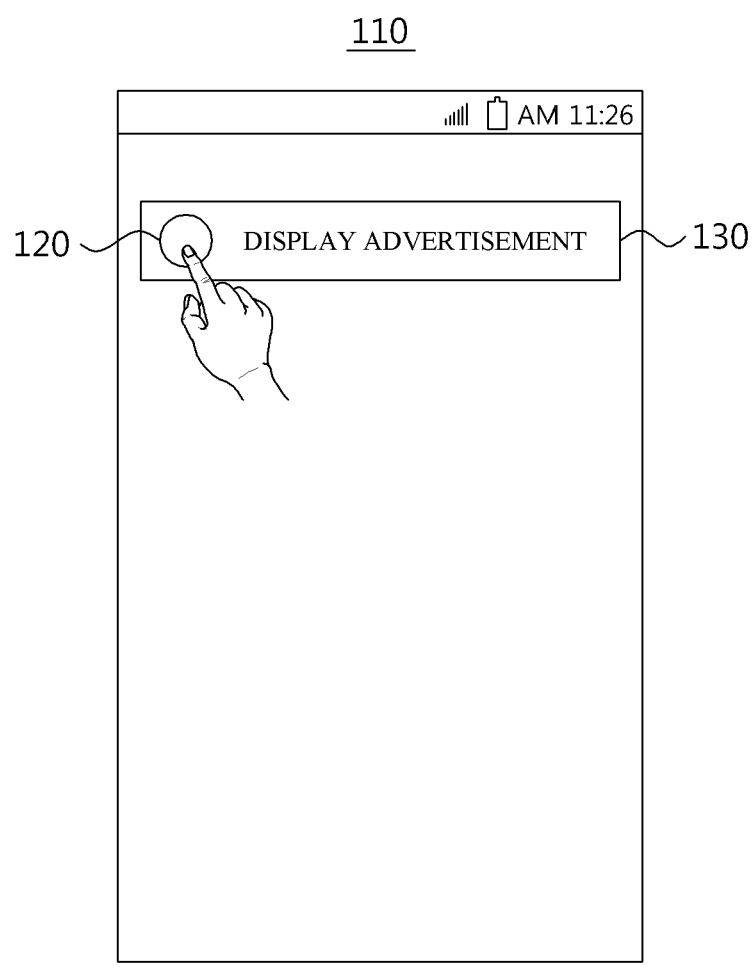
FIG. 1 illustrates an example of a display screen of a mobile device according to an example embodiment.

The example embodiments are described more fully hereinafter with reference to the accompanying drawings, in which the example embodiments are shown. The example embodiments may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments, it is possible to recognize or otherwise determining a region of interest (ROI) of a user by recognizing a gaze of the user in a mobile environment and may modify and/or provide content to the user based on whether the user is interested in the content. The modifying may be modifying a position, a form, and/or a size of an advertisement based on a time duration of interest, such as an amount of time for which the user gazes at the ROI. Additionally, the providing may provide an additional advertisement and/or other like content to a user based on the ROI.

Additionally, according to example embodiments, it is possible to provide a mobile application to a mobile device, such that the mobile application is installed in the mobile device, and the mobile device may be controlled to modify and/or provide content to the mobile device based on whether a user is interested in the content.

Hereinafter, example embodiments will be described in detail with reference to the accompanying drawings.

FIG. 1 illustrates an example of a display screen 110 of a mobile device according to an example embodiment. It should be noted that the mobile device as shown in FIG. 1 may be a hardware computing device including one or more processors, a computer-readable storage medium, a transceiver, and/or one or more electronic image sensors. The mobile device may be capable of sequentially and automatically performing a sequence of arithmetic or logical operations; equipped to record/store digital data on a machine readable medium; and transmit and receive digital data via one or more network devices. The mobile device may be configured to send/receive data to/from network devices, such as a router, switch, or other like network devices, via a wired or wireless connection. The mobile device may include user terminals, such as smart phones, tablet PCs, and/or any other physical or logical device capable of recording, storing, and/or transferring digital data via a connection to a network device. Referring to FIG. 1, a display advertisement 130 including a user interface 120 is displayed on the display screen 110. Here, the user interface 120 may be an interface for receiving a user agreement regarding providing an advertisement using a gaze of a user, such that the user interface 120 may be configured to provide an advertisement according to a gaze of a user. For example, if a user taps the user interface 120, an advertising service, which is configured to use a gaze of the user, may be provided to the user. If the user taps an area corresponding to the display advertisement 130 instead of tapping an area corresponding to the user interface 120, a predetermined and/or desired action such as moving to a mobile site of an advertiser may be implemented.

Even though the user interface 120 is expressed in a simple elliptical shape in FIG. 1, the user interface 120 may be displayed to the user in a variety of shapes. For example, the user interface 120 may be provided in a camera image and be overlapped with the display advertisement 130. Also, content may include advertisement content associated with the display advertisement 130 and may also include other contents.

Figure 2:
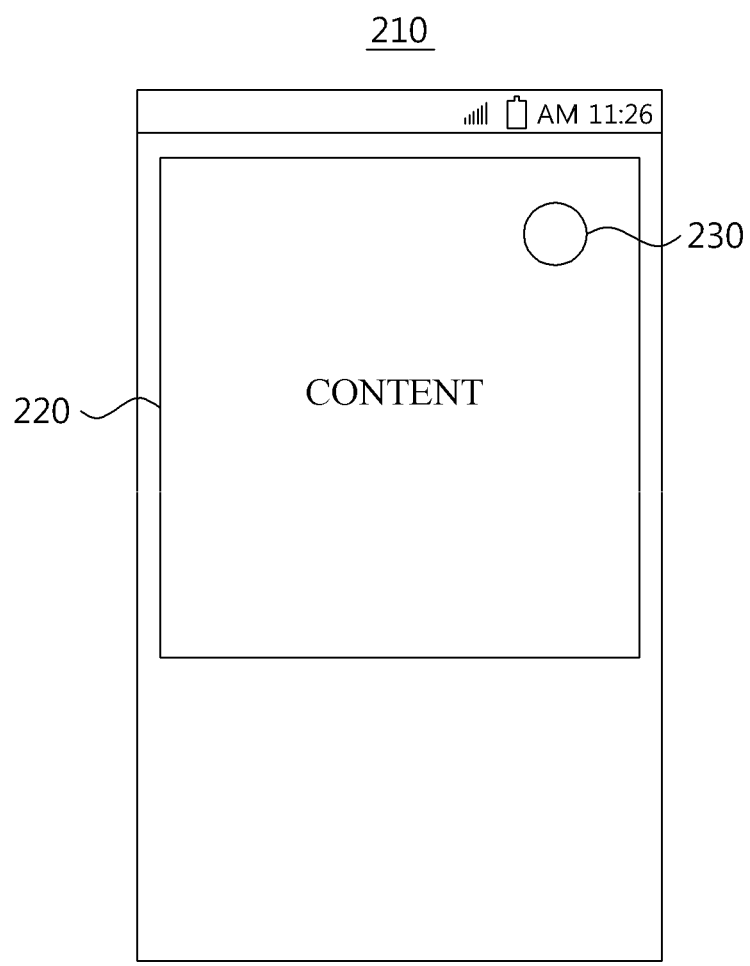
FIG. 2 illustrates another example of a display screen of a mobile device according to an example embodiment.

FIG. 2 illustrates another example of a display screen 210 of a mobile device according to an example embodiment. Referring to FIG. 2, content 220 provided to the user by tapping the user interface 120 of FIG. 1 and a region of interest (ROI) 230 that is associated with a recognized gaze area of the user are displayed on the display screen 210. Here, the gaze area of the user may be recognized using a gaze tracking technology. As described above, in the example embodiments, the gaze area of the user may be recognized by recognizing an eye image of the user using a camera or other like image sensor embedded within or otherwise associated with the mobile device.

The user may gaze at various areas of the display screen 210. Thus, an area at which the user gazes for at least a predetermined or otherwise desired amount of time may be recognized as the ROI 230. For example, when the predetermined amount of time is set as 3 seconds, an area at which the user gazes for 3 seconds or more may be recognized as the ROI 203. In this instance, the ROI 230 and the gaze area may differ. For example, an area on which content is displayed may be divided into a plurality of areas in advance, and an area including the gaze area may be set as the ROI 203. In some example embodiments, other gaze related information detected by the gaze tracking apparatus may be used to indicate the ROI 230. The other gaze related information may include eye rotation speed, change in eye position, pupil and/or cornea size, retinal blood vessel movement, and/or other like gaze related information.

According to example embodiments, the ROI 230 may be a selected subset of the recognized gaze area. In example embodiments, the ROI 230 may be an outline or other like boundary of an area or region of the display screen 210, which the gaze tracking technology determines to be the recognized gaze area. Additionally, it should be noted that the ROI 230 may be determined according to a type of content being displayed on display screen 210, such that the recognized gaze area may change based on the type of content being displayed to a user (e.g., a content type associated with content 220).

According to example embodiments, the content 220 may be modified based on a time duration of interest that is an amount of time for which the user gazes at the area, the ROI 230, and the content 220. For example, the content 220 may be enlarged based on the ROI 230, or may be move to locate the ROI 230 of the user on the center of the display screen 210. As another example, a form and/or a format of the content 220 may be modified, and additional content associated with the content 220 may be provided to replace the content 220 and be displayed.

Figure 3:
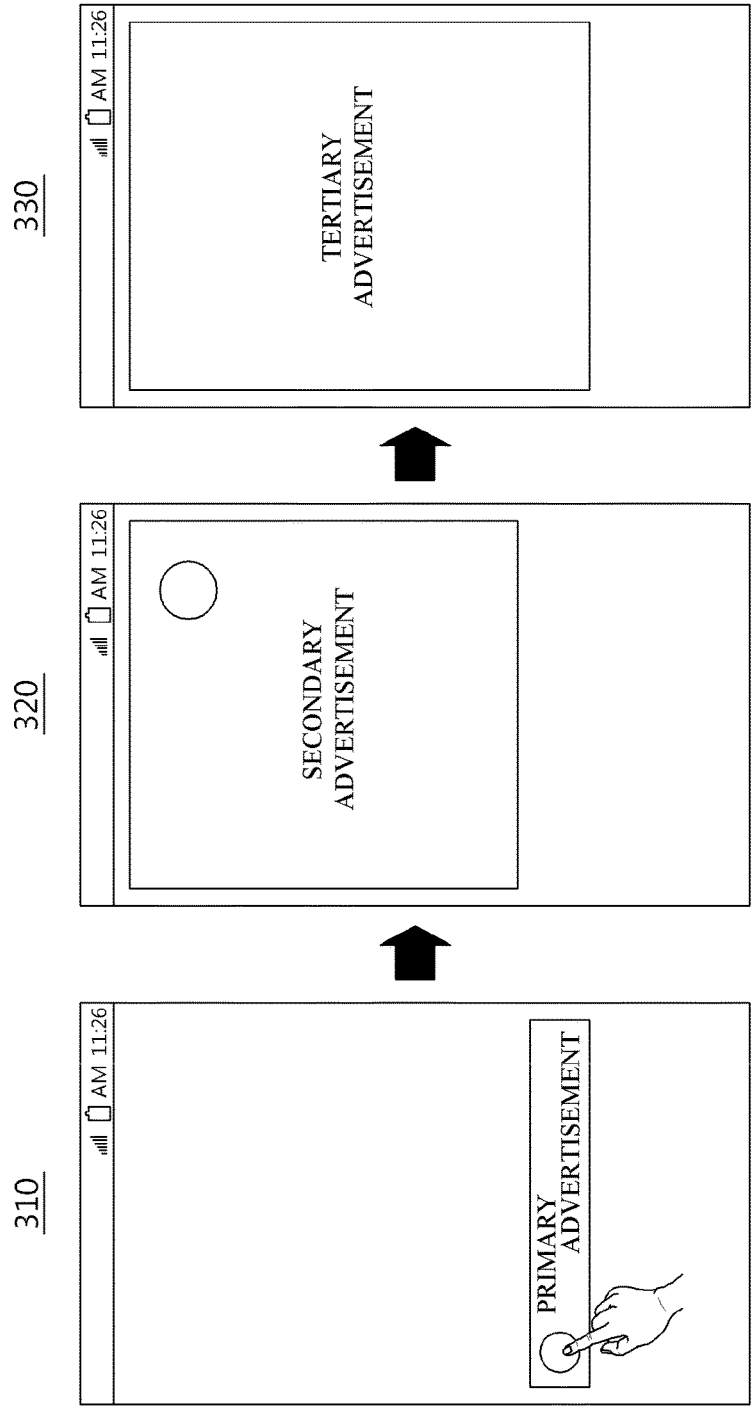
FIG. 3 illustrates an example of providing additional content according to an example embodiment.

FIG. 3 illustrates an example of providing additional content according to an example embodiment. FIG. 3 illustrates a display screen that is sequentially changed in an order of a first display screen 310, a second display screen 320, and a third display screen 330 in response to an occurrence of an event. It should be noted that the first display screen 310, the second display screen 320, and the third display screen 330 may be displayed on the same physical device in succession.

A display advertisement overlapped with a user interface is displayed on the first display screen 310 as a primary advertisement. A secondary advertisement is displayed on the second display screen 320 in response to a user event that is generated via the user interface based on an interaction with the primary advertisement. On the second display screen 320, an ROI is recognized based on a gaze of the user. In a case in which the user gazes at the ROI on the second display screen 320 for at least a predetermined and/or desired amount of time, a tertiary advertisement is displayed on the third display screen 330. In some embodiments, the tertiary advertisement may be displayed based on the user's gaze at the ROI based on other gaze related information.

The tertiary advertisement may be content that is modified from content provided as the secondary advertisement. That is, the secondary advertisement may be modified based on the ROI. For example, when a time duration of interest of the user on the ROI is greater than or equal to a predetermined and/or desired amount of time, at least one of a format, a form, and a size of the secondary advertisement may be modified based on the secondary advertisement and a position of the ROI. Alternatively, the tertiary advertisement may be provided as additional content associated with the secondary advertisement.

Figure 4:
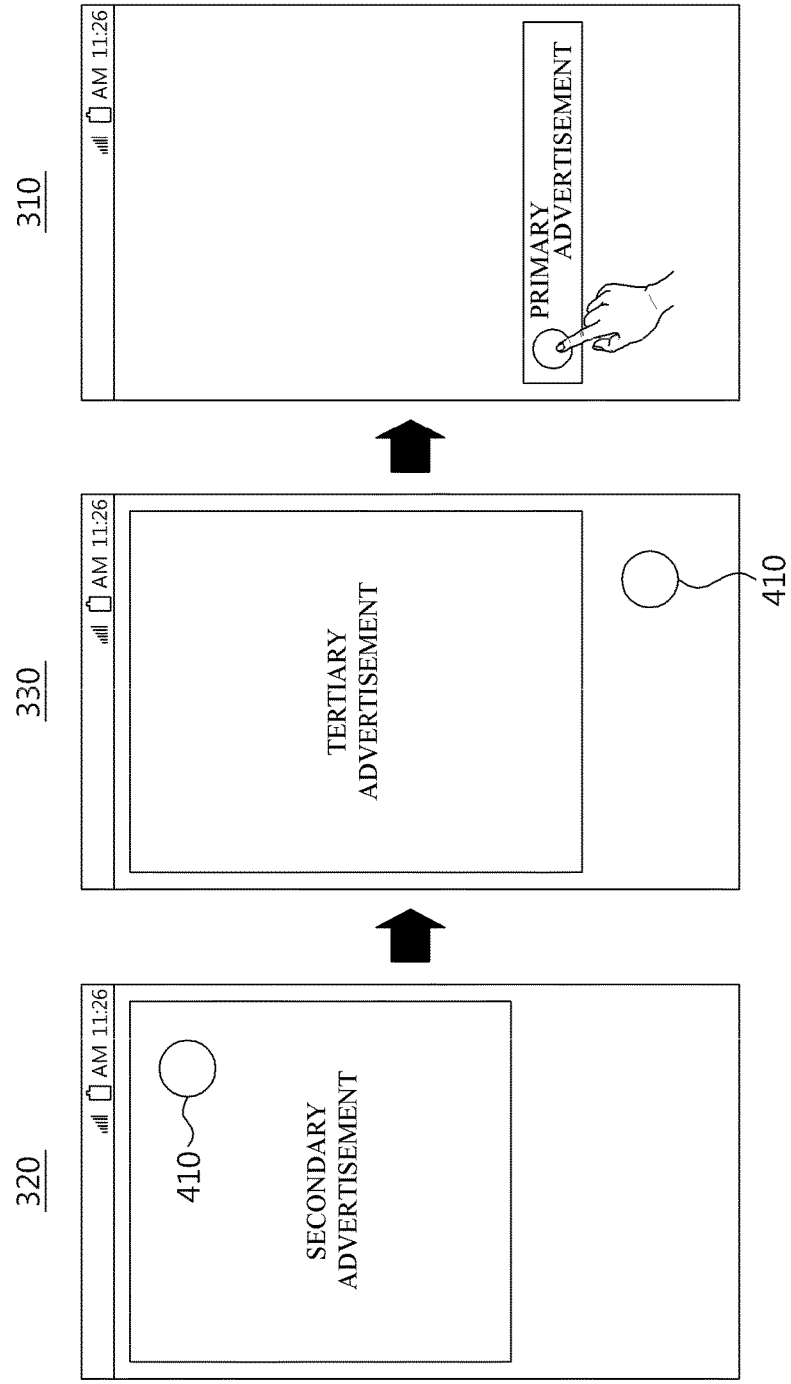
FIG. 4 illustrates an example of terminating displaying of an advertisement according to an example embodiment.

FIG. 4 illustrates an example of terminating displaying of an advertisement according to an example embodiment. FIG. 4 illustrates the display screen of FIG. 3. FIG. 4 illustrates an example of operation where the display of the tertiary advertisement is terminated and the first display screen 310 is displayed again when an ROI 410 of the user is deviated from an advertisement area on the third display screen 330. That is, the user may terminate an additionally displayed advertisement without performing a separate touch action.

Figure 5:
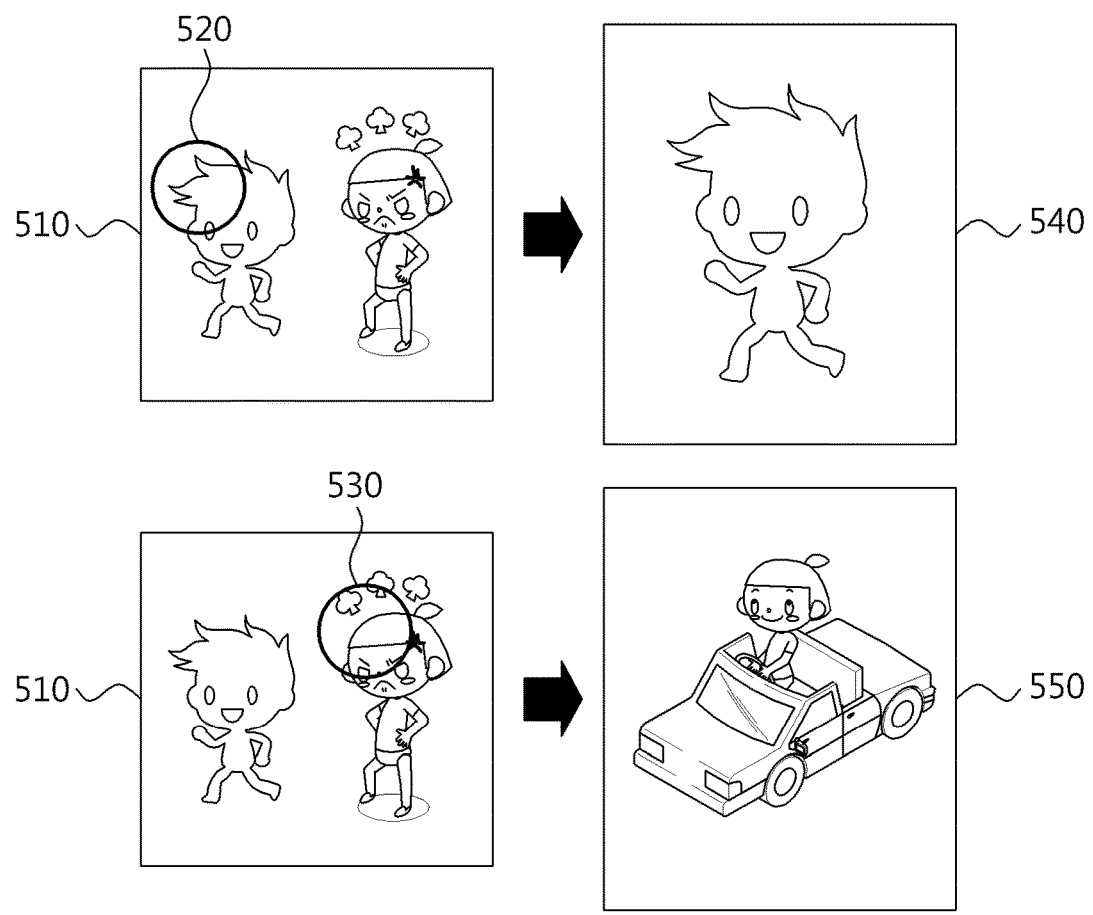
FIG. 5 illustrates an example of differently modifying content based on a position of a region of interest (ROI) on the content according to an example embodiment.

FIG. 5 illustrates an example of differently modifying content based on a position of an ROI on the content according to an example embodiment. Referring to FIG. 5, when a first ROI 520 and a second ROI 530 with respect to displayed content 510 are differently recognized, the content 510 may be changed with different images, for example, a first image 540 and a second image 550. In the first image 540, a predetermined and/or desired portion of the content 510 is enlarged and displayed in response to the first ROI 520. In the second image 550, a portion of additional content associated with the content 510 is displayed in response to recognition of the second ROI 530.

As described above, even with respect to a single item of content, a different action may be implemented based on a position of an ROI being recognized. For example, when the user is recognized to continuously gaze at a predetermined and/or desired actor in an advertisement, an additional advertisement of a format and/or form in which the actor is solely closed up may be displayed to the user. Alternatively, an area in which the predetermined and/or desired actor appears may be enlarged in the existing advertisement and be displayed to the user. Such embodiments may apply to any object, item, and/or region displayed in an advertisement.

Figure 6:
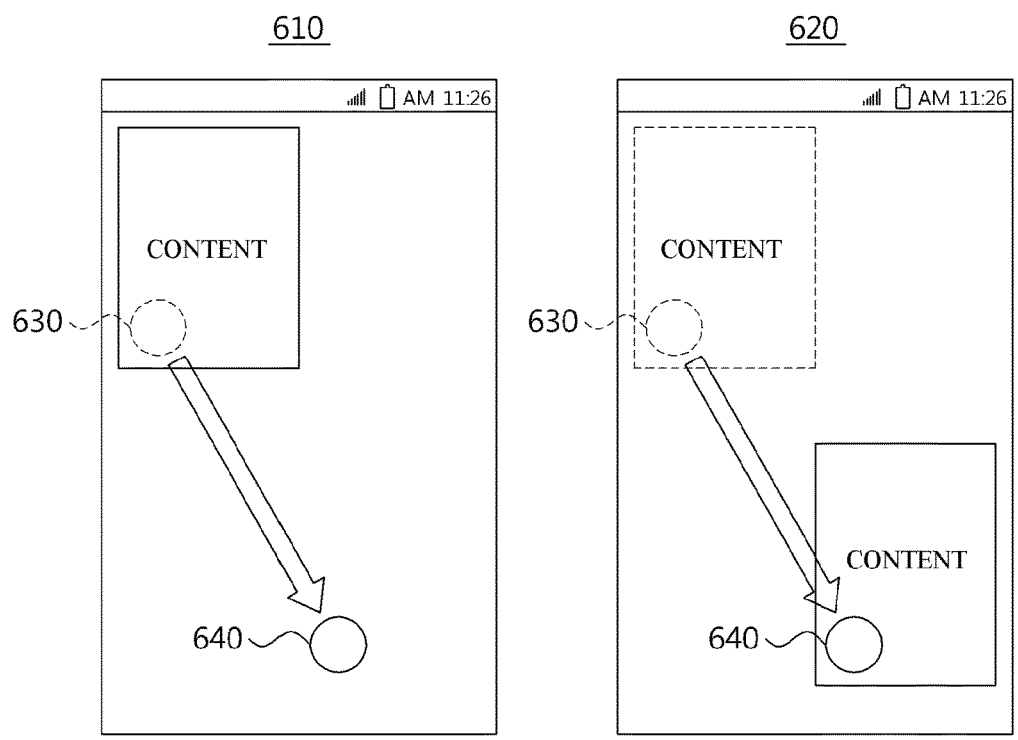
FIG. 6 illustrates examples of moving an advertisement based on a gaze of a user according to an example embodiment.

FIG. 6 illustrates examples of moving an advertisement based on a gaze of a user according to an example embodiment. FIG. 6 illustrates an example in which an ROI is changed from a first ROI position 630 to a second ROI position 640 on a first display screen 610. FIG. 6 also illustrates an example in which content moves from a first ROI position 630 to a second ROI position 640 in response to the changed position of the ROI on a second display 620.

Figure 7:
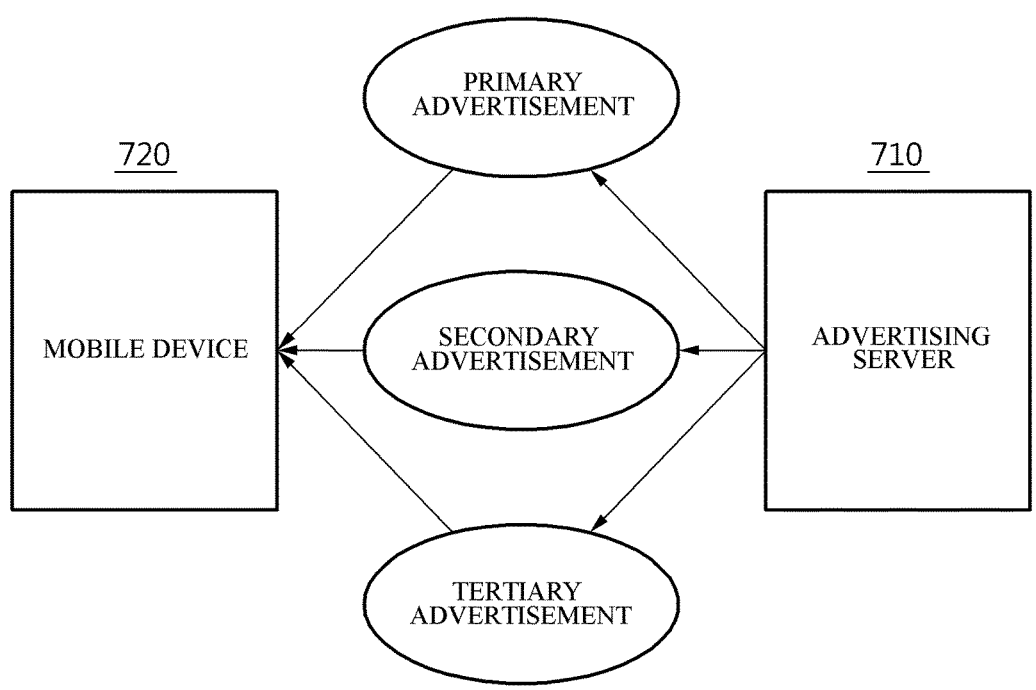
FIG. 7 illustrates a diagram describing a charging method according to an example embodiment.

FIG. 7 illustrates a diagram describing a charging method according to an example embodiment. As described above, an advertising server 710 may provide, to a mobile device 720, a primary advertisement through a tertiary advertisement with respect to a single advertisement material. Here, all of the primary advertisement through the tertiary advertisement may be provided through a single server, or may be provided through different servers.

Here, charging of an advertisement may occur in response to displaying of the primary advertisement and in response to displaying of the tertiary advertisement. As described above, the primary advertisement may be a display advertisement. In this case, an advertiser of the display advertisement may be charged based on a charging scheme in which advertising cost occurs in response to displaying of an advertisement, such as a cost per mill (CPM), or other like advertisement charging scheme. Also, whether to display the tertiary advertisement may be determined based on a level of interest the user has when observing the secondary advertisement. An advertiser of the tertiary advertisement may be charged based on a charging scheme in which advertising cost occurs in response to an action of a user, such as a cost per click (CPC) or other like reaction-based advertisement charging scheme. Accordingly, the charging scheme in which advertising cost occurs in response to displaying of an advertisement and the charging scheme in which advertising cost occurs in response to an action of a user may be applied to corresponding advertisement goods.

Figure 8:
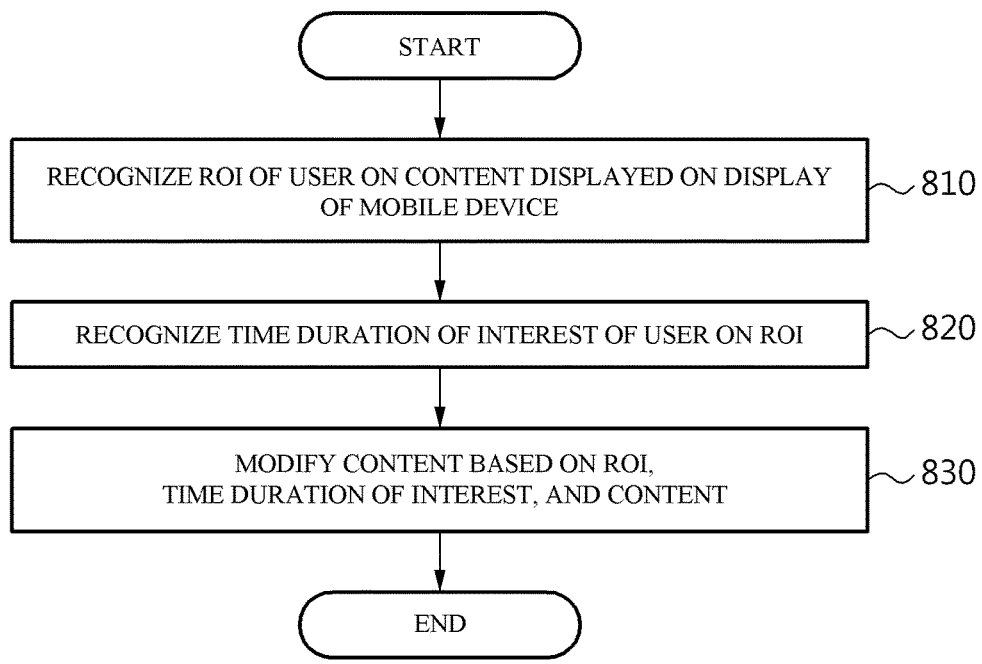
FIG. 8 is a flowchart illustrating an advertisement providing method according to an example embodiment.

FIG. 8 is a flowchart illustrating an advertisement providing method according to an example embodiment. The advertisement providing method of FIG. 8 may be performed through a mobile device.

In operation 810, the mobile device recognizes an ROI on content being displayed on a display of the mobile device. For example, in operation 810, the mobile device may recognize a gaze of the user by analyzing information input through a camera or other like image sensor of the mobile device, and may recognize an area corresponding to the recognized gaze as the ROI using gaze tracking techniques.

In operation 820, the mobile device recognizes a time duration of interest of the user on the ROI. The time duration of interest may indicate an amount of time for which the user gazes at an ROI and/or shows an interest in the ROI. For example, in operation 820, the mobile device may recognize the gaze of the user by analyzing information input through the camera of the mobile device, and may recognize and/or determine a duration of interest based on a duration of time that user gazes at the ROI. Thus, the time duration of interest may be an amount of time that the user gazes at the ROI, which corresponds to the recognized gaze.

That is, the ROI and the time duration of interest may be recognized based on an area at which the user gazes on the currently displayed content and an amount of time for which the user gazes at the area.

In operation 830, the mobile device modifies the currently displayed content based on the ROI, the time duration of interest, and the displayed content. For example, when the time duration of interest is greater than or equal to a predetermined and/or desired amount of time, the mobile device may modify at least one of a form, a format, a size, and/or a position of the content based on at least one of the content and a position of the ROI. Additionally, the mobile device may provide additional content associated with a content type associated with the displayed content. Here, a method of modifying the currently displayed content may be pre-set based on the displayed content, or may be pre-set based on a position of the ROI on the displayed content. A method of modifying the format, the form, the size, and/or the position of the content and/or providing the additional content is described above and thus, a repeated description will be omitted.

As described above, it is possible to recognize an ROI of a user by recognizing a gaze of the user in a mobile environment and to modify and provide content to the user based on whether the user is interested in the displayed content. A position, a form, and/or a size of an advertisement may be modified based on a time duration of interest, such as an amount of time for which the user gazes at the ROI, or by providing an additional advertisement. Through this, an additional advertisement or information may be provided to the user. Also, advertising media may make additional advertising earnings. Further, an advertiser may achieve an enhanced advertising effect by further displaying an advertisement to users interested in the advertisement.

Figure 9:
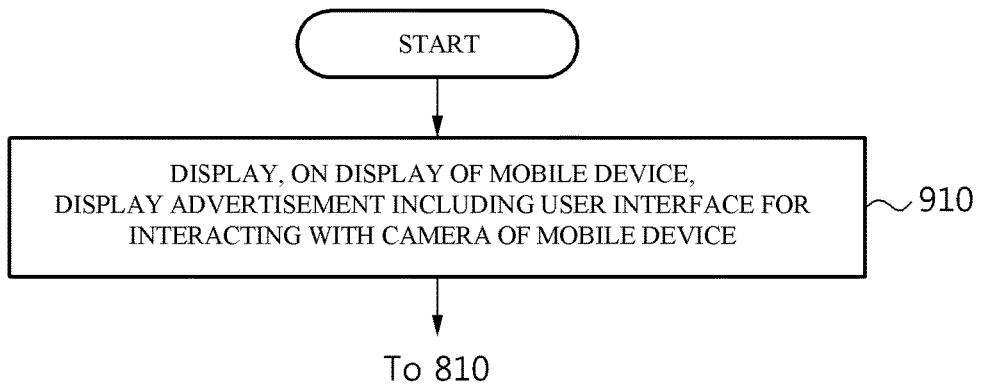
FIG. 9 is a flowchart illustrating a content displaying method according to an example embodiment.

FIG. 9 is a flowchart illustrating a content displaying method according to an example embodiment. A method of displaying the content of FIG. 8 on the display of the mobile device will be described with reference to FIG. 9. To this end, the advertisement providing method of FIG. 8 may further include operation 910 of FIG. 9. Operation 910 may be performed prior to, or concurrently with operation 810.

In operation 910, the mobile device displays, on the display of the mobile device, a display advertisement including a user interface for interacting with a user of the mobile device via a camera or other like image sensor of the mobile device. The content may be displayed on the display of the mobile device in response to a user event generated through the user interface. For example, in response to a user event occurring when the user touches the user interface, content may be displayed.

Here, advertising cost according to displaying of the display advertisement may be charged to the advertiser of the display advertisement. In a case in which the content is modified, additional advertising costs based on a modification of the content may be further charged to the advertiser.

Accordingly, a charging scheme based on determining whether to charge advertising cost according to displaying an advertisement and a charging scheme based on determining whether to charge advertising cost in response to an action of a user may be combined. Additionally, an advertiser may achieve an enhanced advertising effect by displaying an advertisement for at least a predetermined amount of time and at the same time, being additionally charged only for a user being interested in the advertisement of the advertiser.

Figure 10:
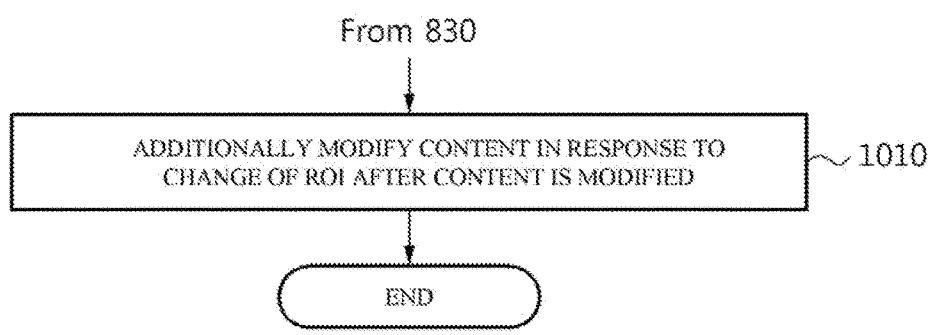
FIG. 10 is a flowchart illustrating a method of additionally modifying content in response to a change of an ROI according to an example embodiment.

FIG. 10 is a flowchart illustrating a method of additionally modifying content in response to a change of an ROI according to an example embodiment. A method of additionally modifying the modified content will be described with reference to FIG. 10. To this end, the advertisement providing method of FIG. 8 may further include operation 1010 of FIG. 10. Here, operation 1010 may be performed after operation 830.

In operation 1010, the mobile device additionally modifies the content in response to a change of the ROI after the content is modified. In this case, the content may be additionally modified based on the changed position of the ROI. For example, the mobile device may restore the modified content to its original state, provide an action corresponding to the changed position of the ROI, or terminate displaying of the content.

In some embodiments, the mobile device may further adjust and/or alter the content based on the how the position of the ROI changes. For example, the gaze tracking apparatus may detect gaze related information may including eye rotation speed, change in eye position, pupil and/or cornea size, retinal blood vessel movement, and/or other like gaze related information. Therefore, in some embodiments, the content may be modified according to a speed of an eye movement, direction of an eye movement, and/or other gaze related criteria.

Additionally, as discussed above, an action may be provided that corresponds to a changed position of the ROI. In some embodiments, the provided action may include execute an application or otherwise carrying out a series of operations in response to the changed and/or changing position of the ROI.

That is, by providing a function capable of conveniently controlling content through a changing gaze of a user, it is possible to enhance a user convenience and to induce and/or maintain an interest of the user.

Figure 11:
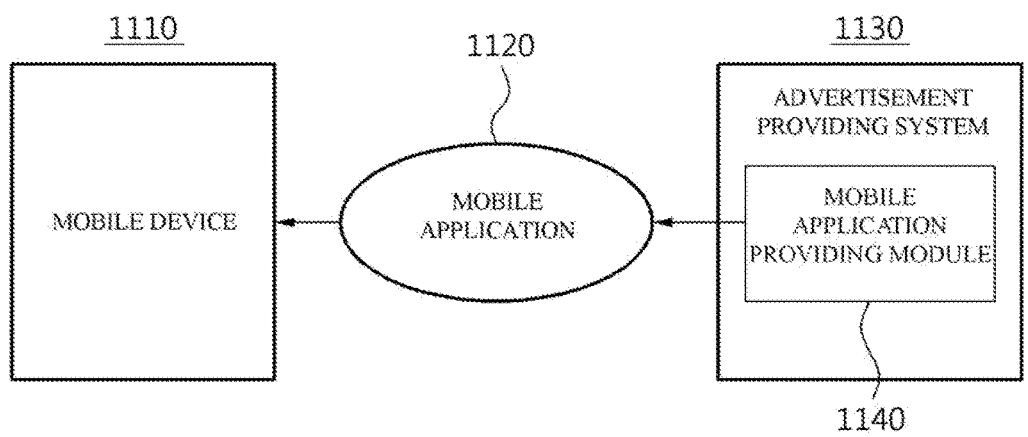
FIG. 11 is a block diagram illustrating an advertisement providing system to distribute a mobile application according to an example embodiment.

FIG. 11 is a block diagram illustrating an advertisement providing system 1130 to distribute a mobile application according to example embodiments. The advertisement providing system 1130 may be a physical computer hardware system that is configured to provide services for client devices (e.g., mobile device 1110) connected to a network. The advertisement providing method described with reference to one of FIGS. 8-10 may be performed at a mobile device 1110 in such a manner that a mobile application 1120 installed in the mobile device 1110 controls the mobile device 1110. To this end, the advertisement providing system 1130 may include a mobile application providing module 1140 that is configured to provide the mobile application 1120 to the mobile device 1110.

The mobile application 1120 may be configured to (i) control the mobile device 1110 to display content on a display of the mobile device 1110; (ii) recognize an ROI of the user on the displayed content; (iii) recognize a time duration of interest of the user on the ROI; and/or (iv) modify the content based on the ROI, the time duration of interest, and the content.

An operation of the mobile device 1110 based on the mobile application 1120 is described with reference to FIGS. 8-10, and thus, a repeated description will be omitted. Also, a description omitted in FIGS. 8-11 may refer to the description made above with reference to FIGS. 1-7.

As described above, according to example embodiments, it is possible to recognize an ROI of a user by recognizing a gaze of the user in a mobile environment and to modify and/or provide content to the user based on whether the user is interested in the content. A position, a form, and/or a size of an advertisement may be modified based on a time duration of interest, such as an amount of time for which the user gazes at the ROI, and/or by providing an additional advertisement.

Also, according to example embodiments, it is possible to provide a mobile application to a mobile device, such that the mobile application is installed in the mobile device to control the mobile device to modify and thereby provide content based on whether a user is interested in the content.

The units and/or modules described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method of modifying content displayed by a mobile device, the method comprising:
   displaying, on a display of the mobile device, a user interface for interacting with a camera of the mobile device, the content being displayed in response to a user event associated with the user interface;
   recognizing, by a processor of the mobile device via the camera, a direction of a gaze of a user with respect to the content, the direction of the gaze of the user being determined by the processor by recognizing eyes of the user from an image acquired by using the camera;
   recognizing, by the processor via the camera of the mobile device, a region of interest (ROI) of the user with respect to the content by
      dividing region of the display where the content is displayed into a plurality of areas,
      determining a gaze area of the user on the display based on input from the camera of the mobile device and the recognizing the direction of the gaze of the user,
      associating the gaze area with one of the plurality of areas of the region based on a location of the gaze area on the display, a detected size of pupils and/or corneas of eyes of the user, and a time duration of the direction of the gaze of the user being directed at the gaze area, the gaze area and the one of the plurality of areas may be different, and
      recognizing the one of the plurality of areas as the ROI;
   determining, by the mobile device, a time duration of interest based on an amount of time for which the direction of the gaze of the user is directed at the ROI; and
   modifying, by the mobile device, the content displayed in the ROI on the display based on the time duration of interest and a content type of the content displayed in the ROI.

2. The method of claim 1 further comprising:
   at least one of,
      modifying at least one of a format, a form, a size, and a position of the content displayed on the display based on at least one of the content type and a position of the content displayed in the ROI, and
      providing additional content associated with the content type when the time duration of interest is greater than or equal to a set amount of time.

3. The method of claim 1, further comprising:
   altering the content displayed on the display when the ROI is changed in response to the modifying.

4. The method of claim 3, wherein the altering comprises:
   at least one of,
      restoring the content displayed on the display to an original state,
      providing an action corresponding to the changed ROI, and
      terminating display of the content displayed on the display.

5. The method of claim 1, wherein the content displayed on the display includes a user interface for interacting with the user of the mobile device, the user interface providing content to the mobile device in response to a user event.

6. The method of claim 5, wherein
the content on the display includes an advertisement, and
the method further comprises:
charging an advertising cost associated with displaying the advertisement to an advertiser; and
charging an additional advertising cost based on modifying the advertisement to the advertiser.

7. A system for modifying displayed content, the system comprising:
a server including a mobile application providing module configured to provide a mobile application to a mobile device, and
the mobile application is for controlling the mobile device to,
display content on a display of the mobile device, a user interface for interacting with a camera of the mobile device, the content being displayed in response to a user event associated with the user interface,
recognize, by a processor of the server via the camera of the mobile device, a direction of a gaze of a user with respect to the content, the direction of the gaze of the user being determined by the processor by recognizing eyes of the user from an image acquired by using the camera,
recognize, by the processor via the camera of the mobile device, a region of interest (ROI) of the user with respect to the content by,
dividing region of the display where the content is displayed into a plurality of areas,
determining a gaze area of the user on the display based on input from the camera of the mobile device and the recognizing the direction of the gaze of the user,
associating the gaze area with one of the plurality of areas of the region based on a location of the gaze area on the display, a detected size of pupils and/or corneas of eyes of the user, and a time duration of the direction of the gaze of the user being directed at the gaze area, the gaze area and the one of the plurality of areas may be different, and
recognizing the one of the plurality of areas as the ROI,
determine a time duration of interest based on an amount of time for which the direction of the gaze of the user is directed at the ROI, and
modify the content displayed in the ROI on the display based on the time duration of interest, and a content type of the content displayed in the ROI.

8. The system of claim 7, wherein the mobile application is for controlling the mobile device to
modify at least one of a format, a form, a size, and a position of a content displayed on the display based on at least one of the content type and a position of the content displayed in the ROI, or
provide additional content associated with the content type when the time duration of interest is greater than or equal to a set amount of time.

9. The system of claim 7, wherein the mobile application is for controlling the mobile device to alter the content displayed on the display when the ROI is changed in response to modifying the content displayed on the display.

10. The system of claim 9, wherein in altering the content displayed on the display, the mobile application is configured to control the mobile device to
restore the modified content to an original state,
provide an action corresponding to the changed ROI, or
terminate displaying of the modified content.

11. The system of claim 7, wherein
the mobile application is configured to control the mobile device to display, on the display of the mobile device, an advertisement, and
the display includes a user interface for interacting with the user of the mobile device such that the user interface provides content to the mobile device in response to a user event.

12. The system of claim 11, wherein
the content displayed on the display includes the advertisement, and
the system for modifying displayed content is configured to
charge an advertising cost associated with displaying the advertisement to an advertiser, and
charge an additional advertising cost to the advertiser based on modifying the content displayed on the display.

13. A non-transitory computer-readable storage medium including computer readable instructions that, when executed by a computer system, cause the computer system to,
displaying, on a display of a mobile device, a user interface for interacting with a camera of the mobile device, a content being displayed in response to a user event associated with the user interface,
recognize, by a processor of a mobile device via the camera of the mobile device, a direction of a gaze of a user with respect to the content, the direction of the gaze of the user being determined by the processor by recognizing eyes of the user from an image acquired by using the camera,
recognize, by the processor via the camera of the mobile device, a region of interest (ROI) of the user with respect to the content by,
dividing region of the display where the content is displayed into a plurality of areas,
determining a gaze area of the user on the display based on input from the camera of the mobile device and the recognizing the direction of the gaze of the user,
associating the gaze area with one of the plurality of areas of the region based on a location of the gaze area on the display, a detected size of pupils and/or corneas of eyes of the user, and a time duration of the direction of the gaze of the user being directed at the gaze area, the gaze area and the one of the plurality of areas may be different, and
recognizing the one of the plurality of areas as the ROI,
determine a time duration of interest based on an amount of time for which the direction of the gaze of the user is directed at the ROI, and
modify the content displayed in the ROI on the display based on the time duration of interest, and a content type of the content displayed in the ROI.

14. A method of modifying content displayed by a mobile device, the method comprising:
displaying, on a display of the mobile device, a user interface for interacting with a gaze tracking device associated with the mobile device, the content being displayed in response to a user event associated with the user interface;

recognizing, by the gaze tracking device associated with the mobile device, a direction of a gaze of a user with respect to the content, the direction of the gaze of the user being determined by the gaze tracking device by recognizing eyes of the user from an image acquired by the gaze tracking device;

recognizing, by the gaze tracking device associated with the mobile device, a region of interest (ROI) of the user with respect to the content by, dividing region of the display where the content is displayed into a plurality of areas, determining a gaze area of the user on the display based on input from the gaze tracking device of the mobile device and the recognizing the direction of the gaze of the user, associating the gaze area with one of the plurality of areas of the region based on a location of the gaze area on the display, a detected size of pupils and/or corneas of eyes of the user, and a time duration of the direction of the gaze of the user being directed at the gaze area, the gaze area and the one of the plurality of areas may be different, and recognizing the one of the plurality of areas as the ROI;

determining, by the mobile device, a time duration of interest based on an amount of time for which the direction of the gaze of the user is directed at the ROI; and modifying, by the mobile device, the content displayed in the ROI on the mobile device based on the time duration of interest, and the content displayed in the ROI.

15. The method of claim 14, wherein the content displayed on the mobile device includes a plurality of areas and the modifying modifies the content displayed on the mobile device according to the gaze detecting device detecting the ROI within at least one of the plurality of areas.

16. The method of claim 14, wherein the modifying modifies the content displayed on the mobile device according to a position of the ROI.

17. The method of claim 14, wherein the modifying modifies the content displayed on the mobile device according to a changing position of the ROI.

* * * * *